(12) United States Patent  
Akiyama

(10) Patent No.: US 8,585,208 B2  
(45) Date of Patent: Nov. 19, 2013

(54) LIGHT SOURCE DEVICE AND PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 13/397,994

(22) Filed: Feb. 16, 2012

(65) Prior Publication Data

US 2012/0236264 A1 Sep. 20, 2012

(30) Foreign Application Priority Data

Mar. 15, 2011 (JP) ................................ 2011-056264

(51) Int. Cl.
*G03B 21/28* (2006.01)
*G03B 21/14* (2006.01)
*F21V 9/16* (2006.01)

(52) U.S. Cl.
USPC ............. 353/31; 353/38; 353/94; 353/99; 362/84; 362/244

(58) Field of Classification Search
USPC ............. 353/38, 94, 31, 34, 37; 362/84, 227, 362/234, 244, 249.02, 260, 311.02, 800
See application file for complete search history.

(56) References Cited

U.S. PATENT DOCUMENTS

| | | | | |
|---|---|---|---|---|
| 6,227,669 | B1* | 5/2001 | Tiao et al. | 353/31 |
| 7,736,019 | B2* | 6/2010 | Shimada et al. | 362/244 |
| 2012/0133904 | A1* | 5/2012 | Akiyama | 353/38 |
| 2012/0230013 | A1* | 9/2012 | Xu | 362/84 |

FOREIGN PATENT DOCUMENTS

| | | |
|---|---|---|
| JP | A-2010-78975 | 4/2010 |
| JP | A-2010-218840 | 9/2010 |
| JP | A-2012-118302 | 6/2012 |

* cited by examiner

*Primary Examiner* — William C Dowling
(74) *Attorney, Agent, or Firm* — Oliff & Berridge, PLC

(57) ABSTRACT

A light source device includes plural solid-state light sources, plural collimator lenses, a collection system, and a fluorescent layer that generates fluorescence from at least a part of the lights from the collection system, wherein at least one anamorphic surface is provided in an optical path from the plural collimator lenses to the fluorescent layer. The plural solid-state light sources are located in positions different from focal positions of the plural collimator lenses in an optical axis direction.

18 Claims, 12 Drawing Sheets

LIGHT SOURCE DEVICE AND PROJECTOR

BACKGROUND

1. Technical Field

The present invention relates to a light source device and a projector.

2. Related Art

In related art, a light source device including plural solid-state light sources, plural collimator lenses that respectively nearly parallelize lights from the plural solid-state light sources, and a collection system that collects light from the plural collimator lenses has been known (for example, Patent Document 1 (JP-A-2010-78975)). According to the light source device in related art, the plural solid-state light sources are provided and high-intensity light can be output.

However, in the light source device in related art, there has been a problem that, for handling of the lights from the plural solid-state light sources, the downstream optical elements (the collection system, an integrator system, etc.) become larger and reduction in size and weight of the light source device becomes difficult.

FIG. 9 is a top view showing an optical system of a projector 900 according to a related earlier application. The sign 901 denotes an illumination device and the sign 902 denotes a light source device.

The inventors of the invention have diligently made further studies for solving the problem, and, as a result, had a thought of a light source device further including "a reflection part 940 that reflects lights from plural collimator lenses 932 (i.e., lights from a solid-state light source array 920) so that distances between optical axes may be made smaller" in addition to the configuration of the related-art light source device as shown in FIG. 9, for example, and already filed it as Japanese Patent Application 2010-268091. According to the light source device of the related earlier application, compared to the light source device in related art, the distances between the optical axes in the lights entering the downstream optical elements can be made smaller, and, as a result, upsizing of the downstream optical elements can be suppressed and reduction in size and weight of the light source device compared to the light source device in related art can be realized.

Incidentally, obtainment of desired color lights by combining solid-state light sources with a fluorescent layer has been widely known. However, in the case where the fluorescent layer is applied to the light source device including the plural solid-state light sources like the light source device in related art, an excessive thermal load may be applied to the fluorescent layer and its life may be made shorter due to deterioration and burnout of the fluorescent layer. In this case, for example, light intensity per unit area of the light entering the fluorescent layer (hereinafter, "light intensity per unit area" will be referred to as "light intensity") may locally exceed 300 W/mm$^2$ (see FIG. 6D, which will be described later). The inventors of the invention have made mention of its solution in the related earlier application.

Specifically, as shown in FIG. 9, by using additional optical elements such as "a downstream collimator system 961 that is provided at the downstream of a collection system 950 and nearly parallelizes light from the collection system 950, a homogenizer 962 that homogenizes an in-plane light intensity distribution of the light from the downstream collimator system 961, and a downstream collection system 966 that collects the light from the homogenizer 962", the peak intensity of the light entering the fluorescent layer (shown by the sign 974 in FIG. 9) can be reduced. As a result, the thermal load applied to the fluorescent layer can be suppressed, and the life can be extended by suppression of the deterioration and burnout of the fluorescent layer.

However, in the above described light source device, there is a problem that light use efficiency may be reduced because the light from the solid-state light source reaches the fluorescent layer through many optical elements. Further, there is another problem that reduction in size and weight of the light source device as the original goal becomes difficult because the number of optical elements forming the light source device is larger.

SUMMARY

An advantage of some aspects of the invention is to provide a light source device whose life can be extended by suppressing deterioration and burnout of a fluorescent layer. Furthermore, reduction of light use efficiency can be suppressed, and reduction in size and weight of the light source device can be realized. Further, another advantage of some aspects of the invention is to provide a projector including the light source device in which the light use efficiency is higher and the reduction in size and weight of the light source device can be realized.

[1] An aspect of the invention is directed to a light source device including plural solid-state light sources, plural collimator lenses that respectively nearly parallelize lights from the solid-state light sources, a collection system that collects the lights from the plural collimator lenses, and a fluorescent layer that generates fluorescence from at least a part of the lights from the collection system, wherein at least one anamorphic surface is provided in an optical path from the plural collimator lenses to the fluorescent layer, and the plural solid-state light sources are located in positions different from focal positions of the plural collimator lenses in an optical axis direction.

According to the light source device of the aspect of the invention, at least one anamorphic surface is provided in the optical path from the plural collimator lenses to, the fluorescent layer, and the plural solid-state light sources are located in the positions different from focal positions of the plural collimator lenses in an optical axis direction. Accordingly, as shown in the respective embodiments, which will be described later, the peak intensity of the light entering the fluorescent layer can be reduced. Here, the peak intensity of the light entering the fluorescent layer refers to the highest intensity of the light intensity in the light entering the fluorescent layer. As a result, the thermal load applied to the fluorescent layer can be suppressed, and the life can be extended by suppression of the deterioration and burnout of the fluorescent layer.

Further, according to the light source device of the aspect of the invention, unlike the light source device according to the related earlier application, the reduction of the peak intensity of the light entering the fluorescent layer is realized by using the anamorphic surface and adjustment of the positional relationship between the solid-state light sources and the collimator lenses without using additional optical elements. Accordingly, the light from the solid-state light source reaches the fluorescent layer via not so many optical elements, and the reduction of the light use efficiency can be suppressed. Further, the number of optical elements forming the light source device is not so large, and the reduction in size and weight of the light source device is not difficult.

Therefore, the light source device of the aspect of the invention is a light source device whose life can be extended by suppressing deterioration and burnout of a fluorescent layer and reduction of light use efficiency can be suppressed, and reduction in size and weight of the light source device can be realized.

Further, according to the light source device of the aspect of the invention, since the plural solid-state light sources are provided like the light source device in related art, high-intensity light can be output.

Note that "anamorphic surface" refers to a surface having curvature in a direction (for example, the longitudinal direction) and curvature in another direction (for example, the lateral direction) different from each other. In the light source device of the aspect of the invention, the anamorphic surface may be provided on any surface as long as it is a surface that passes light or a surface that reflects light such as a light-incident surface of a lens, a light-exiting surface of a lens, or a reflection surface of a mirror. Further plural anamorphic surfaces may be provided.

[2] In the light source device of the aspect of the invention, it is preferable that the collection system includes a first collecting lens, and at least one surface of a light-exiting surface and a light-incident surface of the first collecting lens includes an anamorphic surface.

According to the configuration, the reduction of light use efficiency can be suppressed and the reduction in size and weight of the light source device can be realized.

[3] In the light source device of the aspect of the invention, it is preferable that the collection system comprises one collecting lens, and a light-exiting surface of the collecting lens includes an anamorphic surface, and a light-incident surface of the collecting lens includes a rotationally symmetric aspheric surface.

According to the configuration, the condition of the incidence of the light entering the fluorescent layer can be adjusted using the light-incident surface including the rotationally symmetric aspheric surface.

In the light source device of the aspect of the invention, it is preferable to further include, in an optical path from the plural collimator lenses to the collection system, a reflection part that reflects the lights from the plural collimator lenses so that distances between optical axes may be made smaller.

According to the configuration, like the light source device of the related earlier application, compared to the light source device in related art, the distances between the optical axes in the lights entering the downstream optical elements can be made smaller. As a result, upsizing of the downstream optical elements can be suppressed and the reduction in size and weight of the light source device compared to the light source device in related art can be realized.

[4] In the light source device of the aspect of the invention, it is preferable that the anamorphic surface includes a cylindrical surface having a generating line perpendicular to a direction in which the distances between the optical axes are made smaller.

According to the configuration, the reduction of light use efficiency can be suppressed and the reduction in size and weight of the light source device can be realized by the simpler configuration.

Note that "cylindrical surface" refers to a surface having curvature along the generating line of zero and a kind of anamorphic surface.

[5] In the light source device of the aspect of the invention, it is preferable that the reflection part is formed in stripes and includes plural reflection surfaces along a direction perpendicular to a direction in which the distances between the optical axes are made smaller, and one of the plural reflection surfaces includes an anamorphic surface.

Also, according to the configuration, the reduction of light use efficiency can be suppressed and the reduction in size and weight of the light source device can be realized.

Further, according to the configuration, the optical path may be controlled by adjustment of the positions of the respective reflection surfaces formed in stripes. As a result, the distances between the optical axes in the lights entering the downstream optical elements can be made smaller, and the design of the light source device can be made easier.

Note that, in the light source device of the aspect of the invention, as shown in the embodiments, which will be described later, it is more preferable to include both "the first collecting lens at least one surface of the light-exiting surface and the light-incident surface including an anamorphic surface" described in [2] and "the reflection part having the reflection surface including an anamorphic surface" described in [5].

[6] In the light source device of the aspect of the invention, it is preferable that the anamorphic surface includes a cylindrical surface having a generating line perpendicular to a direction in which the distances between the optical axes are made smaller.

According to the configuration, the reduction of light use efficiency can be suppressed and the reduction in size and weight of the light source device can be realized by the simpler configuration.

[7] In the light source device of the aspect of the invention, it is preferable that the fluorescent layer is provided in a position different from the focal position of the collection system in the optical axis direction.

According to the configuration, the thermal load applied to the fluorescent layer can be further suppressed and the life can be further extended by suppression of the deterioration and burnout of the fluorescent layer.

[9] In the light source device of the aspect of the invention, it is preferable that the solid-state light sources include semiconductor lasers.

Since the semiconductor laser (also referred to as "laser diode") is small and high-power, the semiconductor lasers are integrated with high density, and thereby, a small high-power light source device can be realized.

Further, the laser output from the semiconductor laser has high coherence and is hard to be dissipated until it reaches the downstream optical element, and thus, the light use efficiency can be made higher.

[10] Another aspect of the invention is directed to a projector including an illumination device including the light source device according to the aspect of the invention, a light modulation device that modulates light output from the illumination device, and a projection system that projects the light from the light modulation device.

According to the projector of the aspect of the invention, the light source device according to the aspect of the invention is provided, and thus, the light use efficiency is higher and the reduction in size and weight can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
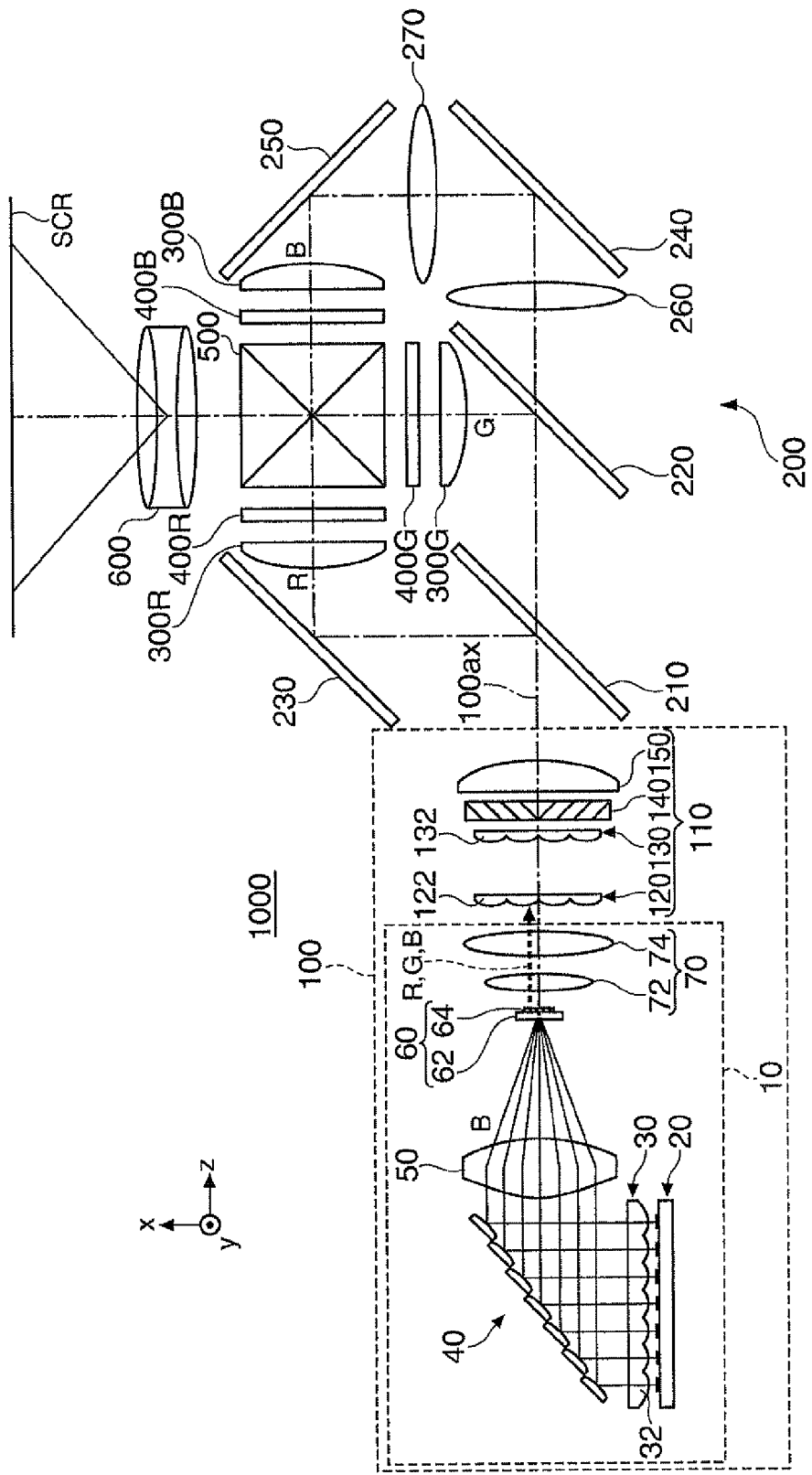
FIG. 1 is a top view showing an optical system of a projector according to embodiment 1.

As below, a light source device and a projector of the invention will be explained according to embodiments shown in the drawings.

Embodiment 1

FIG. 1 is a top view showing an optical system of a projector 1000 according to embodiment 1.

Figure 2A:
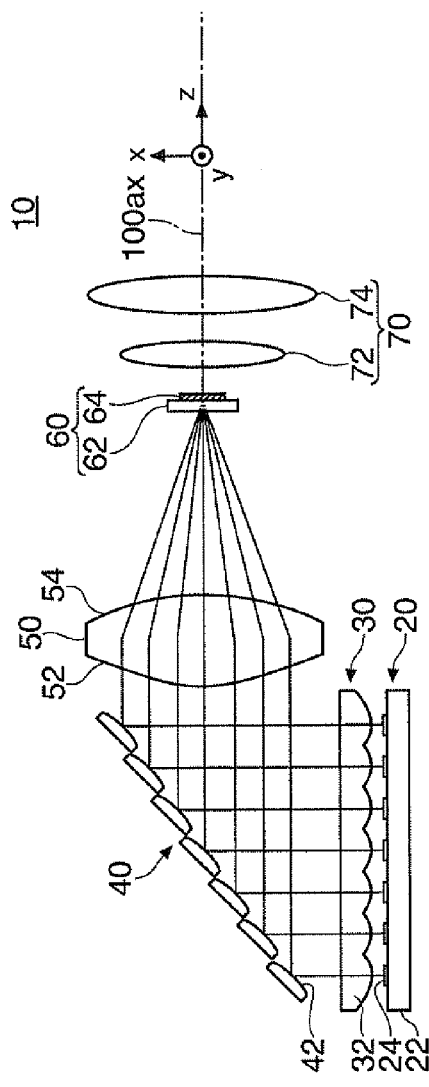
FIGS. 2A and 2B are diagrams for explanation of a light source device according to embodiment 1.
Figure 2B:
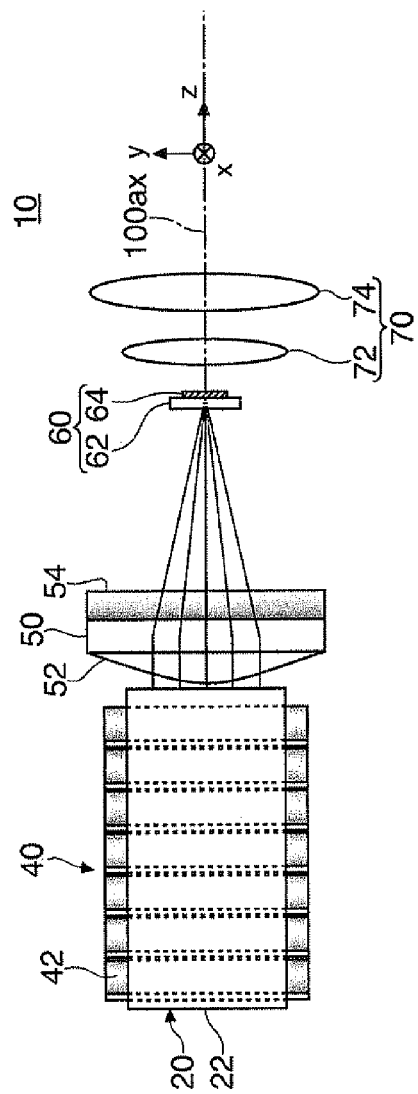

FIGS. 2A and 2B are diagrams for explanation of a light source device 10 according to embodiment 1. FIG. 2A is a top view of the light source device 10 according to embodiment 1, and FIG. 2B is a side view of the light source device 10 according to embodiment 1.

Figure 3:
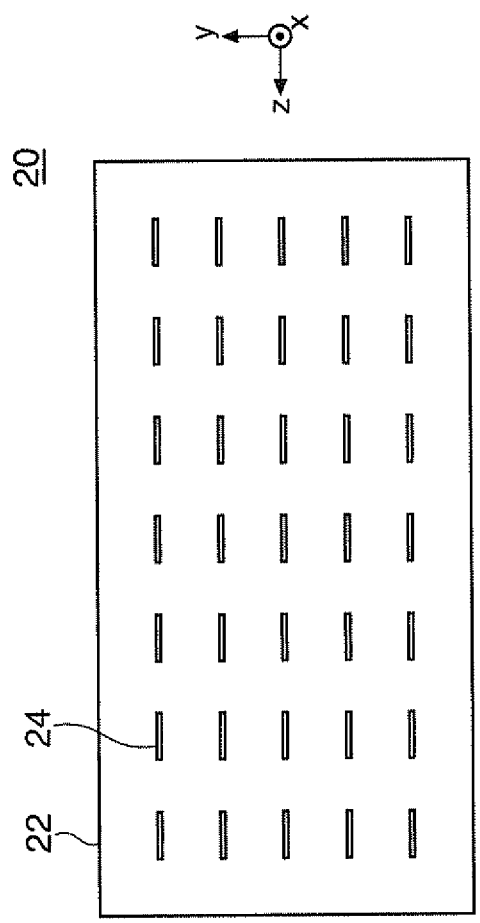
FIG. 3 is a diagram for explanation of a solid-state light source array in embodiment 1.

FIG. 3 is a diagram for explanation of a solid-state light source array 20 in embodiment 1.

Figure 4A:
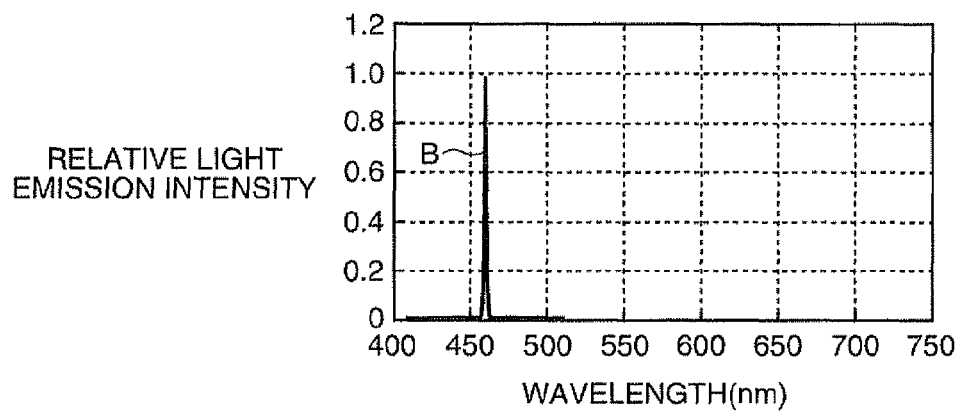
FIGS. 4A and 4B are graphs showing light emission intensity characteristics of a solid-state light source and light emission intensity characteristics of a fluorescent material in embodiment 1.
Figure 4B:
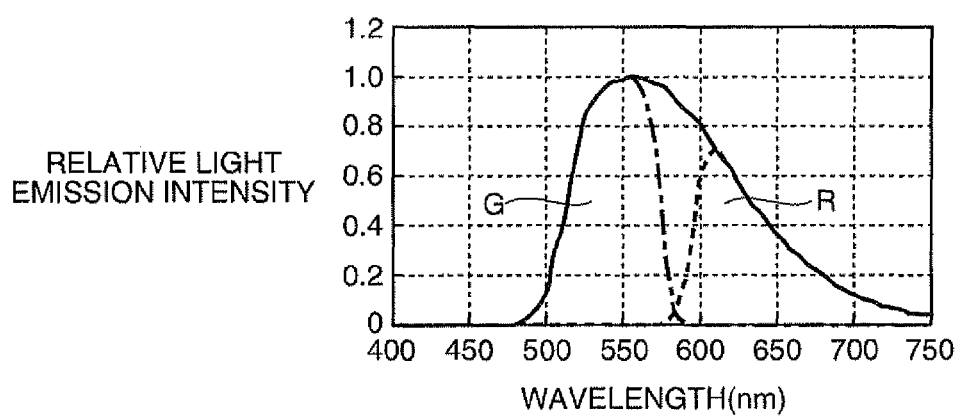

FIGS. 4A and 4B are graphs showing light emission intensity characteristics of a solid-state light source 24 and light emission intensity characteristics of a fluorescent material in embodiment 1. FIG. 4A is a graph showing the light emission intensity characteristics of the solid-state light source 24, and FIG. 4B is a graph showing the light emission intensity characteristics of the fluorescent material contained in a fluorescent layer 64. The light emission intensity characteristics refer to characteristics as to which wavelength of light is output with how much intensity when a voltage is applied for a light source or when excitation light enters for a fluorescent material. The vertical axis of the graph indicates relative light emission intensity and the light emission intensity at a wavelength with the highest light emission intensity is "1". The horizontal axis of the graph indicates the wavelength.

Figure 5B:
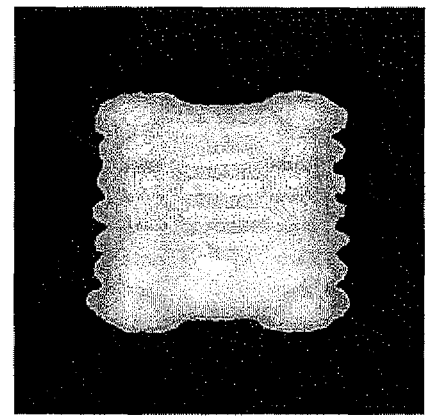
FIGS. 5A and 5B are graphs showing light intensity of blue light entering a fluorescent layer and an in-plane light intensity distribution of the blue light entering the fluorescent layer in embodiment 1.
Figure 5A:
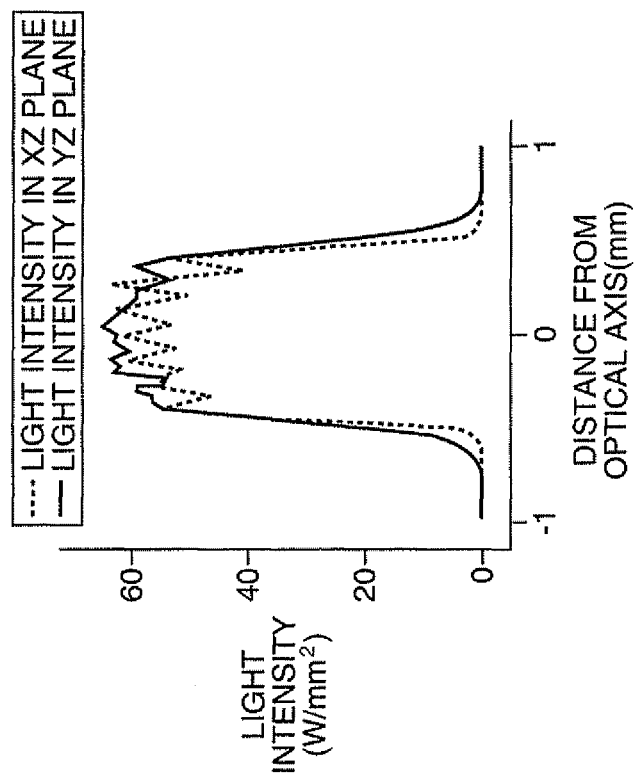

FIG. 5A is a graph showing light intensity of blue light entering the fluorescent layer 64 and FIG. 5B is a graph showing an in-plane light intensity distribution of the blue light entering the fluorescent layer 64 in embodiment 1. Note that the vertical axis of FIG. 5A indicates the light intensity of the blue light entering the fluorescent layer 64. The horizontal axis indicates a distance from an illumination optical axis 100ax. The unit of light intensity is "W/mm$^2$", and the unit of the distance from the illumination optical axis is "mm". The units are the same in FIGS. 6C, 7C, and 8C, which will be described later. Further, in FIG. 5B, the intensity of the entering light (blue light) is larger as the color is closer to white. This is the same in FIGS. 6D, 7D, and 8D, which will be described later.

Note that, in the respective drawings, three directions orthogonal to one another are shown as a z-axis direction (an illumination optical axis 100ax direction in FIG. 1), an x-axis direction (a direction parallel to a paper surface and perpendicular to the z-axis in FIG. 1), and a y-axis direction (a direction perpendicular to the paper surface and perpendicular to the z-axis in FIG. 1).

As shown in FIG. 1, the projector 1000 according to embodiment 1 includes an illumination device 100, a color separation and guiding system 200, a liquid crystal light modulation device 400R, a liquid crystal light modulation device 400G, a liquid crystal light modulation device 400B as light modulation devices, a cross dichroic prism 500, and a projection system 600.

The illumination device 100 includes the light source device 10 according to embodiment 1, and a lens integrator system 110. The illumination device 100 outputs light containing red light, green light, and blue light (i.e., light used as white light) as illumination light.

As shown in FIGS. 1 and 2A and 2B, the light source device 10 includes the solid-state light source array 20 having plural solid-state light sources 24, a collimator lens array 30 having plural collimator lenses 32, a reflection part 40, a collection system 50, a fluorescence generation part 60, and a collimator system 70.

As shown in FIG. 3, the solid-state light source array 20 is a solid-state light source array having the plural solid-state light sources 24, and specifically, has a substrate 22 and 35 solid-state light sources 24 generating blue light. In the solid-state light source array 20, the 35 solid-state light sources 24 are arranged in a matrix of five rows and seven columns, and are located in positions different from the focal position of the collimator lens array 30 in the optical axis direction (x-axis direction) (i.e., defocus positions).

Note that, in the projector of the invention, the number of solid-state light sources is not limited to 35 as long as it may be two or more. Further, the respective solid-state light sources may be discretely arranged.

The substrate 22 has a function of mounting the solid-state light sources 24. Though the detailed explanation will be omitted, the substrate 22 also has a function of mediating supply of electric power to the solid-state light sources 24, a function of releasing heat generated in the solid-state light sources 24, etc.

The solid-state light source 24 includes a semiconductor laser that generates blue light (the peak of light emission intensity: about 460 nm, see FIG. 4A). As shown in FIG. 3, the semiconductor laser has a light emission region having a rectangular shape, and is formed so that the spread angle along the short side direction of the light emission region may be larger than the spread angle along the long side direction of the light emission region.

As shown in FIGS. 1 and 2A, the collimator lens array 30 has 35 collimator lenses 32 (the sign denotes only one at the end) that nearly parallelize the lights generated in the 35 solid-state light sources 24, respectively. Though the detailed explanation by illustration will be omitted, the 35 collimator lenses 32 are arranged in a matrix of five rows and seven columns corresponding to the 35 solid-state light sources 24. The collimator lens 32 is an aspheric plano-convex lens having a light-incident surface as a hyperboloidal surface and a light-exiting surface as a flat surface.

Note that the respective collimator lenses may be discretely arranged.

As shown in FIGS. 1 and 2A and 2B, the reflection part 40 reflects the lights from the collimator lens array 30 toward the collection system 50 so that the distances between the optical axes can be made smaller. The reflection part 40 is formed in stripes and includes seven reflection surfaces 42 along a direction (y-axis direction) perpendicular to the direction in which the distances between the optical axes are made smaller (x-axis direction).

The reflection surface 42 includes a cylindrical surface having a generating line (generating line along the y-axis direction) perpendicular to the direction in which the distances between the optical axes are made smaller.

As shown in FIGS. 1 and 2A and 2B, the collection system 50 comprises one collecting lens and collects the light from the collimator lens array 30 via the reflection part 40 to a predetermined collection position. The collecting lens forming the collection system 50 is a first collecting lens in the invention.

The collection system 50 includes a cylindrical surface having a light-incident surface 52 as a rotationally symmetric aspheric surface and a light-exiting surface 54 having a generating line (generating line along the y-axis direction) perpendicular to the direction in which the distances between the optical axes are made smaller (x-axis direction).

The fluorescence generation part 60 has the fluorescent layer 64 that generates fluorescence containing red light (peak of light emission intensity: about 610 nm) and green light (peak of light emission intensity: about 550 nm) from a part of the blue light from the collection system 50 (see FIG. 4B). Further, the part has a transparent member 62 that supports the fluorescent layer 64. The fluorescence generation part 60 outputs light containing blue light passing through the fluorescent layer 64 without contributing to the generation of fluorescence with fluorescence (red light and green light) (i.e., the light that can be used as white light). The fluorescence generation part 60 has a square plate-like shape as a whole, and fixed into a predetermined position (see FIGS. 1 and 2A and 2B).

The transparent member 62 passes at least the light (blue light) from the collection system 50. The transparent member 62 is formed by optical glass, for example. Note that, on the transparent member, a layer (for example, a dielectric multilayer film) that passes the light from the collection system and reflects fluorescence may be formed.

The fluorescent layer 64 is provided in a position different from the focal position of the collection system 50 in the optical axis direction (i.e., in a defocus position).

The light with reduced peak intensity as shown in FIGS. 5A and 5B enters the fluorescent layer 64 because of an anamorphic surface (cylindrical surface) of the reflection part 40, an anamorphic surface of the collection system 50, and the above described positional relationship between the solid-state light sources 24 and the collimator lenses 32. The peak intensity here is about 65 W/mm$^2$.

The fluorescent layer 64 includes a YAG fluorescent material. Note that, as the fluorescent layer, a fluorescent layer containing another fluorescent material (silicate fluorescent material, TAG fluorescent material, or the like) may be used. Further, as the fluorescent layer, a fluorescent layer containing a fluorescent material that converts blue light into red light (for example, $CaAlSiN_3$ red fluorescent material) and a fluorescent material that converts blue light into green light (for example, β-sialon green fluorescent material) may be used.

Note that, the part of blue light passing through the fluorescent layer 64 without contributing to the generation of fluorescence is output together with the fluorescence. In this regard, the blue light is scattered or reflected within the fluorescent layer 64, and is output from the fluorescence generation part 60 as light having nearly the same distribution (so-called Lambertian distribution) characteristics as those of the fluorescence.

The collimator system 70 nearly parallelizes the light from the fluorescence generation part 60. As shown in FIGS. 1 and 2A and 2B, the collimator system 70 includes a first lens 72 and a second lens 74. The first lens 72 and the second lens 74 include biconvex lenses.

The lens integrator system 110 includes a first lens array 120, a second lens array 130, a polarization conversion element 140, and a superimposing lens 150.

Note that, in place of the lens integrator system, a rod integrator system including an integrator rod may be used.

The first lens array 120 has plural first small lenses 122 for dividing the light from the light source device 10 into plural partial luminous fluxes. The first lens array 120 has a function as a luminous flux division optical element that divides the light from the light source device 10 into plural partial luminous fluxes, and has a configuration in which the plural first small lenses 122 are arranged in a matrix with plural rows and plural columns within a plane orthogonal to the illumination optical axis 100ax. Though the detailed explanation will be omitted, the outer shape of the first small lens 122 is a nearly similarity shape with respect to the outer shapes of image formation regions of the liquid crystal light modulation devices 400R, 400G, 400B.

The second lens array 130 has plural second small lenses 132 corresponding to the plural first small lenses 122 in the first lens array 120. The second lens array 130 has a function of focusing images of the respective first small lenses 122 near the image formation regions of the liquid crystal light modulation devices 400R, 400G, 400E with the superimposing lens 150. The second lens array 130 has a configuration in which the plural second small lenses 132 are arranged in a matrix with plural rows and plural columns within the plane orthogonal to the illumination optical axis 100ax.

The polarization conversion element 140 is a polarization conversion element that outputs the respective partial luminous fluxes divided by the first lens array 120 as nearly one kind of linearly-polarized light in the same polarization direction.

The polarization conversion element 140 has a polarized light separation layer that transmits one linearly-polarized component of the polarized components contained in the light from the light source device 10 without change and reflects the other linearly-polarized component in a direction perpendicular to the illumination optical axis 100ax, a reflection layer that reflects the other linearly-polarized component reflected by the polarized light separation layer in a direction in parallel to the illumination optical axis 100ax, and a retardation film that converts the other linearly-polarized component reflected by the reflection layer into the one linearly-polarized component.

The superimposing lens 150 is an optical element that collects the respective partial luminous fluxes from the polarization conversion element 140 and superimposes them near the image formation regions of the liquid crystal light modulation devices 400R, 400G, 400B. The superimposing lens 150 is provided so that the optical axis of the superimposing lens 150 and the illumination optical axis 100ax may be nearly aligned. Note that the superimposing lens may be formed by a compound lens with combined plural lenses.

The color separation and guiding system 200 includes dichroic mirrors 210, 220, reflection mirrors 230, 240, 250, and relay lenses 260, 270. The color separation and guiding system 200 has a function of separating the light from the illumination device 100 into red light, green light, and blue light and guiding the red light, the green light, and the blue light to the liquid crystal light modulation devices 400R, 400G, 400B to be illuminated, respectively.

Collecting lenses 300R, 300G, 300E are provided between the color separation and guiding system 200 and the liquid crystal light modulation devices 400R, 400G, 400B.

The dichroic mirrors 210, 220 have wavelength-selective transmission films that reflect lights in predetermined wavelength regions and transmit lights in other wavelength regions formed on substrates.

The dichroic mirror 210 reflects a red light component and transmits a green light component and a blue light component.

The dichroic mirror 220 reflects the green light component and transmits the blue light component.

The red light reflected by the dichroic mirror 210 is further reflected by the reflection mirror 230, passes through the collecting lens 300R, and enters the image formation region of the liquid crystal light modulation device 400R for red light.

The green light passing through the dichroic mirror 210 with the blue light is reflected by the dichroic mirror 220, passes through the collecting lens 300G, and enters the image formation region of the liquid crystal light modulation device 400G for green light.

The blue light passing through the dichroic mirror 220 enters the image formation region of the liquid crystal light modulation device 400B for blue light through the relay lens 260, the reflection mirror 240 at the light-incident side, the relay lens 270, the reflection mirror 250 at the light-exiting side, and the collecting lens 300B. The relay lenses 260, 270 and the reflection mirrors 240, 250 have a function of guiding the blue light component passing through the dichroic mirror 220 to the liquid crystal light modulation device 400B.

Note that the relay lenses 260, 270 are provided in the optical path of the blue light for prevention of reduction of light use efficiency due to diverging light or the like because the length of the optical path of the blue light is longer than the lengths of the optical paths of the other color lights. In the projector 1000 according to embodiment 1, the configuration is employed because the length of the optical path of the blue light is longer, however, for example, a configuration in which the length of the optical path of the red light is made longer and the relay lenses and the reflection mirrors are used for the optical path of the red light is conceivable.

The liquid crystal light modulation devices 400R, 400G, 400B are light modulation devices that modulate light from the illumination device 100 in response to image information, and modulate incident color lights in response to the image information and form a color image. Note that, though the illustration is omitted, light incident-side polarizers are respectively provided between the collecting lenses 300R, 300G, 300B and the liquid crystal light modulation devices 400R, 400G, 400B, and light exiting-side polarizers are respectively provided between the liquid crystal light modulation devices 400R, 400G, 400B and the cross dichroic prism 500. The light modulation of the respective incident color lights is performed by these light incident-side polarizers, respective liquid crystal light modulation devices, and light exiting-side polarizers.

The respective liquid crystal light modulation devices are transmissive liquid crystal light modulation devices in which liquid crystal as an electrooptic material is closely sealed between a pair of transparent glass substrates, and modulate the polarization direction of one kind of linearly polarized light output from the light incident-side polarizers in response to provided image signals using polysilicon TFTs as switching elements, for example.

The cross dichroic prism 500 is an optical element that combines optical images modulated with respect to each color light output from the light exiting-side polarizers and forms a color image. The cross dichroic prism 500 has a nearly square shape in a plan view formed by bonding four right angle prisms, and dielectric multilayer films are formed on nearly X-shaped interfaces formed by bonding the right angle prisms. The dielectric multilayer film formed on one of the nearly X-shaped interfaces reflects red light and the dielectric multilayer film formed on the other interface reflects blue light. The red light and the blue light are bent by the dielectric multilayer films and aligned in the traveling direction of the green light, and the three color lights are combined.

The light from the cross dichroic prism 500 is projected by the projection system 600 and forms an image on the screen SCR.

Next, advantages of the light source device 10 and the projector 1000 according to embodiment 1 will be explained.

According to the light source device 10 of embodiment 1, at least one anamorphic surface is provided in the optical path from the plural collimator lenses 32 to the fluorescent layer 64. Further, one solid-state light source 24 of the plural solid-state light sources 24 is located in the position different from the focal position of the collimator lens 32 corresponding to the one solid-state light source 24 of the plural collimator lenses 32 in the optical axis direction. Accordingly, the peak intensity of the light entering the fluorescent layer can be reduced. As a result, the thermal load applied to the fluorescent layer can be suppressed and the life can be extended by suppression of the deterioration and burnout of the fluorescent layer.

Further, according to the light source device 10 of embodiment 1, the reflection part 40 that reflects the lights from the plural collimator lenses 32 so that the distances between the optical axes can be made smaller is further provided. Accordingly, like the light source device according to the related earlier application, compared to the light source device in related art, the distances between the optical axes in the lights entering the downstream optical elements can be made smaller. As a result, upsizing of the downstream optical elements can be suppressed and reduction in size and weight of the light source device compared to the light source device in related art can be realized.

Furthermore, according to the light source device 10 of the embodiment, unlike the light source device according to the related earlier application, the peak intensity of the light (blue light) entering the fluorescent layer 64 is reduced by using the anamorphic surface and adjustment of the positional relationship between the solid-state light sources 24 and the collimator lenses 32 without using additional optical elements. Accordingly, the light from the solid-state light source reaches the fluorescent layer via not so many optical elements, and the reduction of the light use efficiency can be suppressed. Further, the number of optical elements forming the light source device is not so large, and the reduction in size and weight of the light source device is not difficult.

Therefore, the light source device 10 according to embodiment 1 is a light source device whose life can be extended by suppressing deterioration and burnout of the fluorescent layer. Furthermore, the reduction of light use efficiency can be suppressed, and the reduction in size and weight of the light source device can be realized.

Further, according to the light source device 10 of embodiment 1, since the plural solid-state light sources 24 are provided like the light source device in related art, high-intensity light can be output.

Furthermore, according to the light source device 10 of embodiment 1, since the collection system 50 comprises one collecting lens and the light-exiting surface 54 of the collecting lens includes the anamorphic surface (cylindrical surface), the reduction of light use efficiency can be suppressed and the reduction in size and weight of the light source device can be realized.

In addition, according to the light source device 10 of embodiment 1, since the light-incident surface 52 includes the rotationally symmetric aspheric surface, the condition of the incidence of the light entering the fluorescent layer can be adjusted using the light-incident surface including the rotationally symmetric aspheric surface.

Further, according to the light source device 10 of embodiment 1, since the anamorphic surface in the collection system 50 includes the cylindrical surface having the generating line perpendicular to the direction in which the distances between the optical axes are made smaller, the reduction of light use efficiency can be suppressed and the reduction in size and weight of the light source device can be realized by the simpler configuration.

Furthermore, according to the light source device 10 of embodiment 1, since the reflection surface 42 of the reflection part 40 includes the anamorphic surface (cylindrical surface), the reduction of light use efficiency can be suppressed and the reduction in size and weight of the light source device can be realized.

In addition, according to the light source device 10 of embodiment 1, plural reflection surfaces 42 formed in stripes along the direction perpendicular to the direction in which the distances between the optical axes are made smaller are provided. Accordingly, the optical path may be controlled by adjustment of the positions of the respective reflection surfaces formed in stripes. As a result, the distances between the optical axes in the lights entering the downstream optical elements can be made smaller, and the design of the light source device can be made easier.

Further, according to the light source device 10 of embodiment 1, since the anamorphic surface in the reflection part 40 includes the cylindrical surface having the generating line perpendicular to the direction in which the distances between the optical axes are made smaller, the reduction of light use efficiency can be suppressed and the reduction in size and weight of the light source device can be realized by the simpler configuration.

Furthermore, according to the light source device 10 of embodiment 1, since the fluorescent layer 64 is provided in the position different from the focal position of the collection system 50 in the optical axis direction, the thermal load applied to the fluorescent layer can be further suppressed and the life can be further extended by suppression of the deterioration and burnout of the fluorescent layer.

In addition, according to the light source device 10 of embodiment 1, since the solid-state light sources 24 include the semiconductor lasers, the semiconductor lasers are integrated with high density and a small high-power light source device can be realized. Further, the laser output from the semiconductor laser has high coherence and is hard to be dissipated until it reaches the downstream optical element, and thus, the light use efficiency can be made higher.

Since the projector 1000 according to embodiment 1 includes the light source device 10 according to embodiment 1, the light use efficiency is higher and the reduction in size and weight can be realized.

Comparative Examples

Figure 6A:
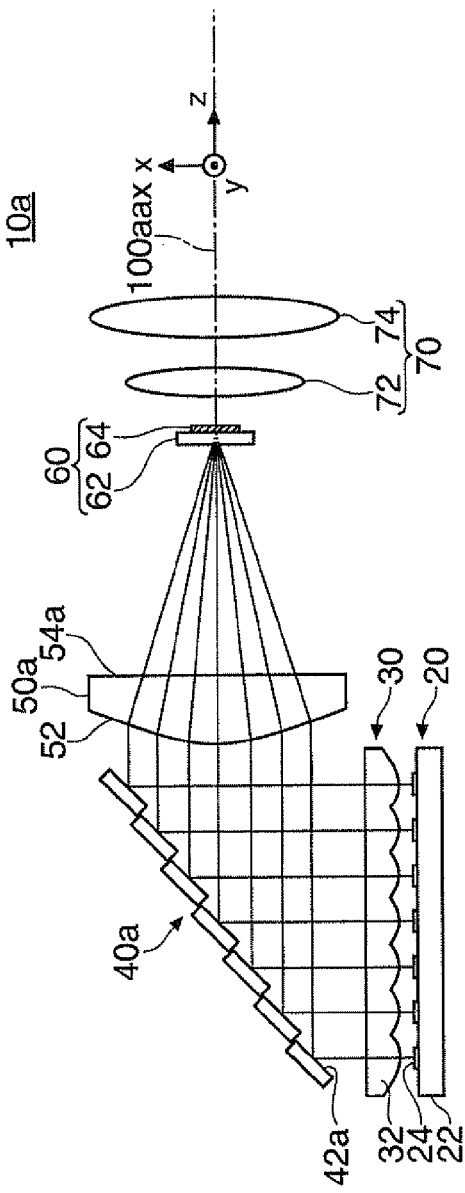
FIGS. 6A to 6D are diagrams for explanation of a light source device according to comparative example 1.
Figure 6B:
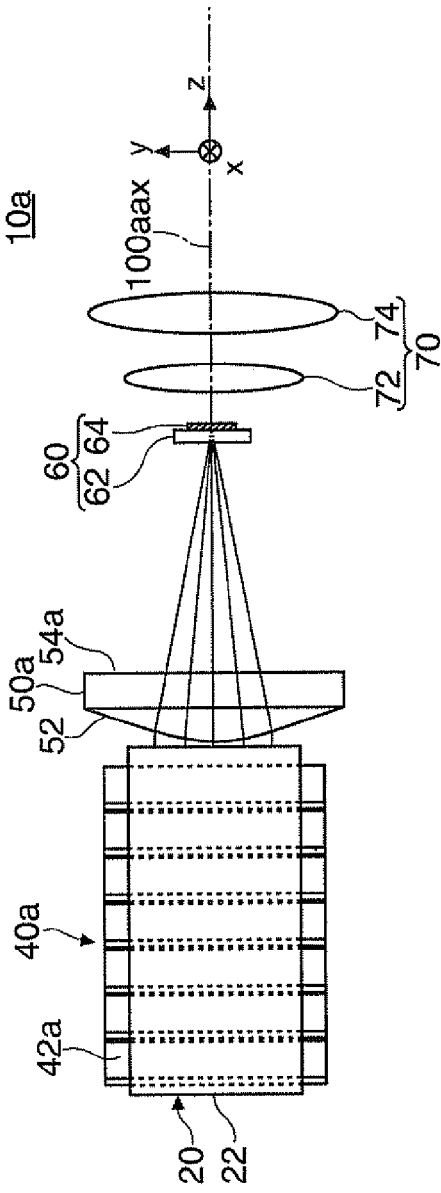
Figure 6D:
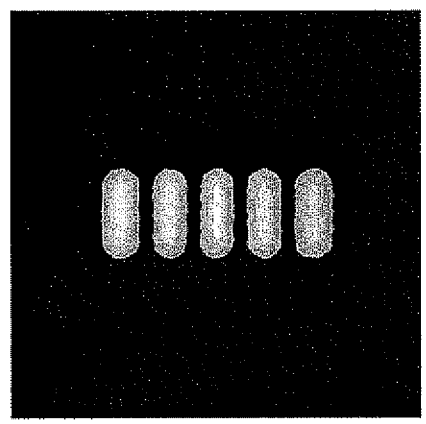
Figure 6C:
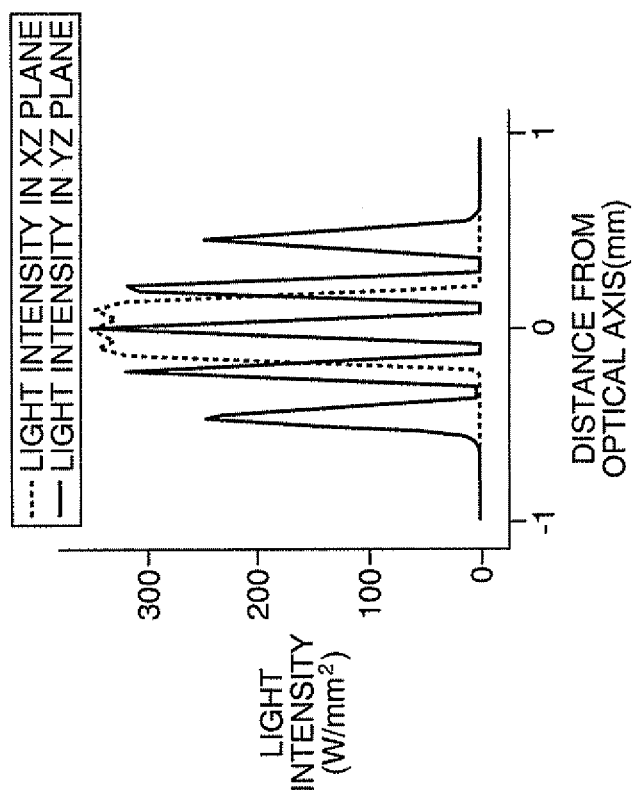

FIGS. 6A to 6D are diagrams for explanation of a light source device 10*a* according to a comparative example. FIG. 6A is a top view showing the light source device 10*a* according to the comparative example, FIG. 6B is a side view of the light source device 10*a* according to the comparative example, FIG. 6C is a graph showing light intensity of blue light entering the fluorescent layer 64, and FIG. 6D shows an in-plane light intensity distribution of the blue light entering the fluorescent layer 64.

The light source device 10*a* according to the comparative example basically has the similar configuration to that of the light source device 10 according to embodiment 1, however, the reflection surface of the reflection part and the light-exiting surface of the collection system are different from those of the light source device 10 according to embodiment 1. That is, the light source device 10*a* according to the comparative example has a reflection surface 42*a* of a reflection part 40*a* and a light-exiting surface 54*a* of the collection system 50*a* as flat surfaces as shown in FIGS. 6A and 6B.

Accordingly, in the light source device 10*a* according to the comparative example, as shown in FIGS. 6C and 6D, though the similar configuration to that of the light source device 10 according to embodiment 1 is provided except the configurations of the reflection part and the collection system, the peak intensity of the light entering the fluorescent layer 64 can not be reduced. Accordingly, the peak intensity of the light entering the fluorescent layer 64 becomes higher to about 350 W/mm$^2$. As a result, it may be impossible to suppress the thermal load applied to the fluorescent layer, or it may be impossible to extend the life by suppression of the deterioration and burnout of the fluorescent layer.

Embodiment 2

Figure 7A:
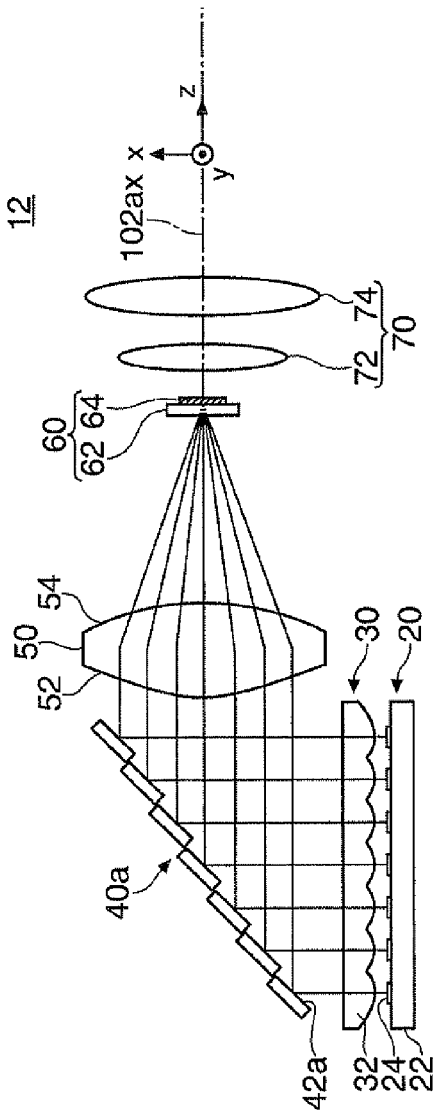
FIGS. 7A to 7D are diagrams for explanation of a light source device according to embodiment 2.
Figure 7B:
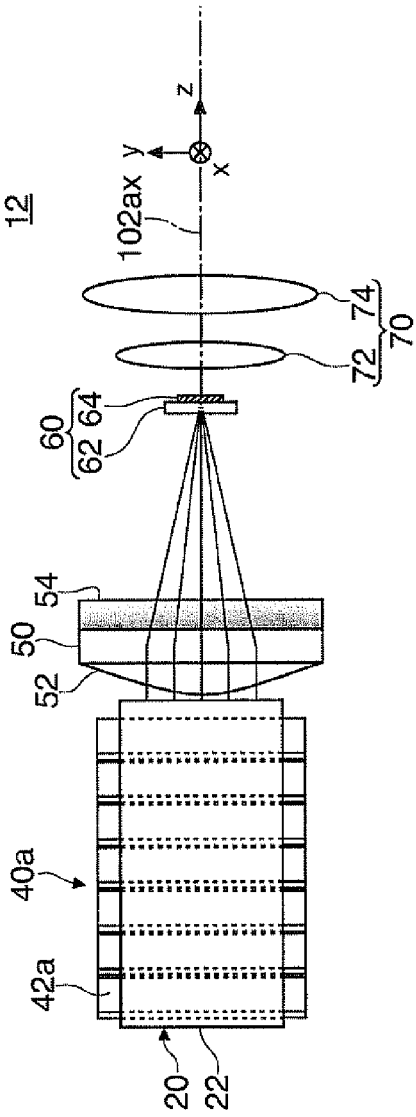
Figure 7D:
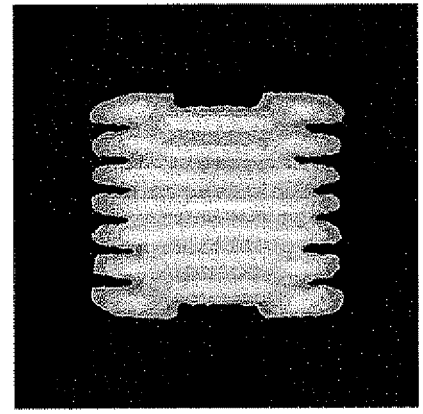
Figure 7C:
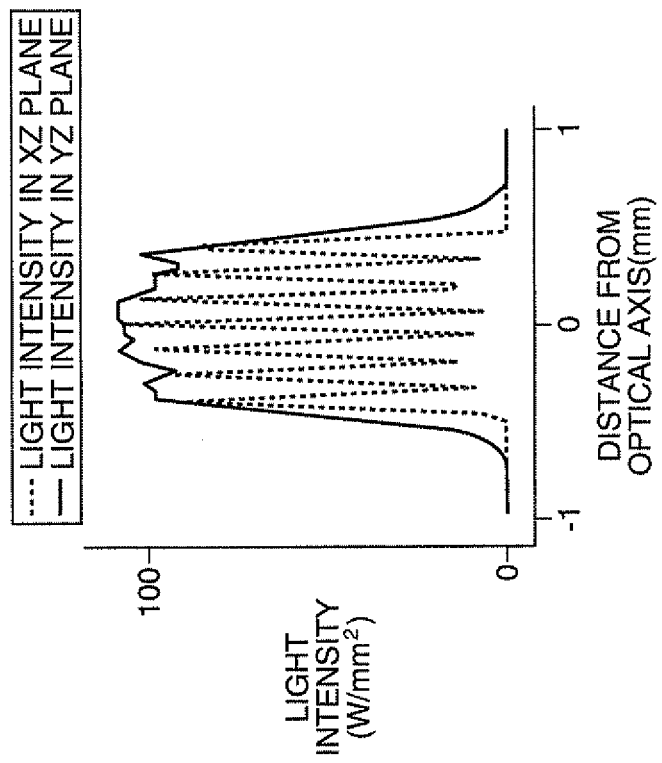

FIGS. 7A to 7D are diagrams for explanation of a light source device 12 according to embodiment 2. FIG. 7A is a top view showing the light source device 12 according to embodiment 2, FIG. 7B is a side view of the light source device 12 according to embodiment 2, FIG. 7C is a graph showing light intensity of blue light entering the fluorescent layer 64, and FIG. 7D shows an in-plane light intensity distribution of the blue light entering the fluorescent layer 64.

The light source device 12 according to embodiment 2 basically has the similar configuration to that of the light source device 10 according to embodiment 1, however, the reflection surface of the reflection part is different from that of the light source device 10 according to embodiment 1. That is, the light source device 12 according to embodiment 2 has a reflection surface 42*a* of a reflection part 40*a* as a flat surface as shown in FIGS. 7A and 7B.

As described above, in the light source device 12 according to embodiment 2, the reflection surface 42*a* of the reflection part 40*a* comprises the flat surface. However, as shown in FIGS. 7C and 7D, the light with reduced peak intensity enters the fluorescent layer 64 because of the anamorphic surface (cylindrical surface) of the collection system 50 and the above described positional relationship between the solid-state light sources 24 and the collimator lenses 32. The peak intensity here is about 110 W/mm$^2$.

As a result, though the light source device 12 according to embodiment 2 is different from the light source device 10 according to embodiment 1 in the reflection surface of the reflection part, the life can be extended by suppression of the deterioration of the fluorescent layer and by burnout of the fluorescent layer as is the case of the light source device 10 according to embodiment 1. Further, the reduction of the light use efficiency can be suppressed and the reduction in size and weight of the light source device can be realized.

Note that, the light source device 12 according to embodiment 2 has the similar configuration to that of the light source device 10 according to embodiment 1 except the reflection surface of the reflection part, and thus, has the corresponding advantages of the advantages of the light source device 10 according to embodiment 1 as they are.

Embodiment 3

Figure 8A:
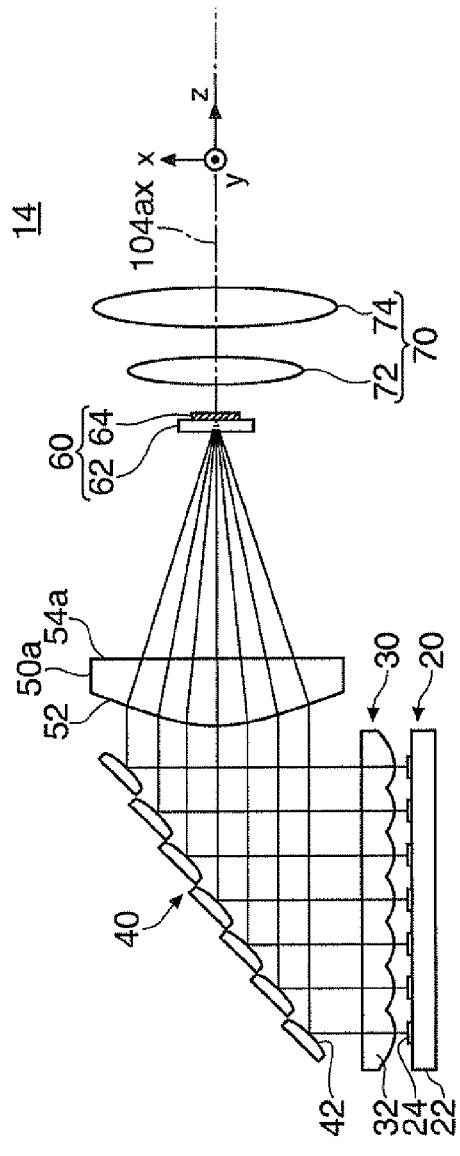
FIGS. 8A to 8D are diagrams for explanation of a light source device according to embodiment 3.
Figure 8B:
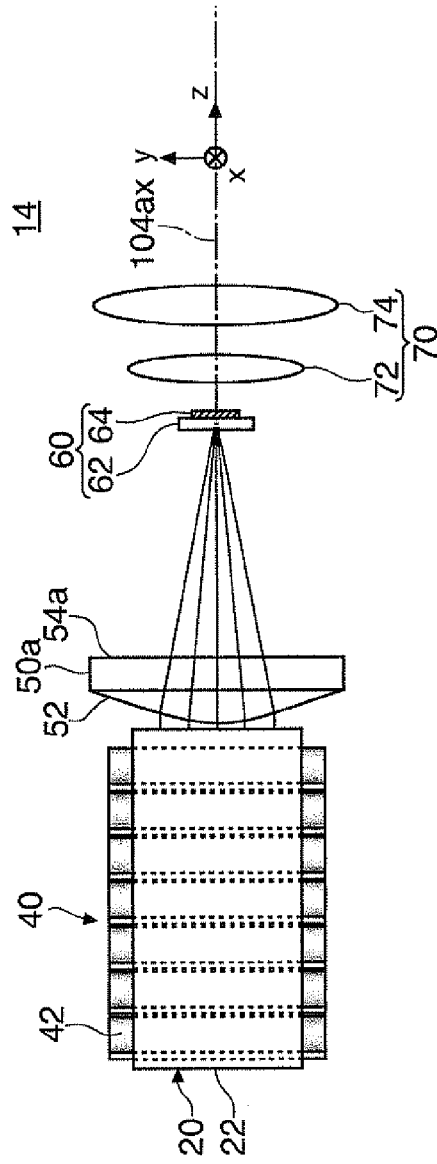
Figure 8D:
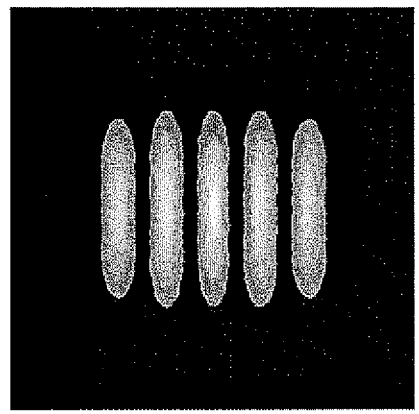
Figure 8C:
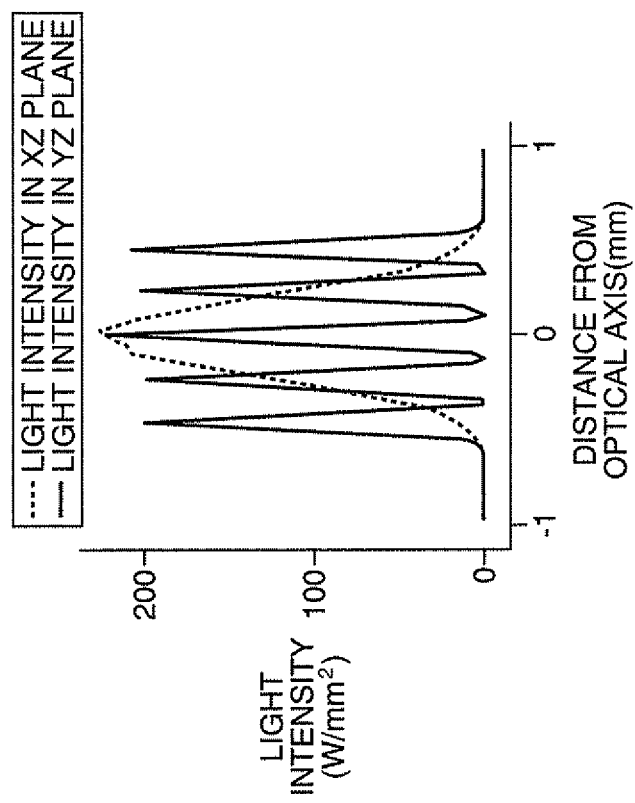
Figure 9:
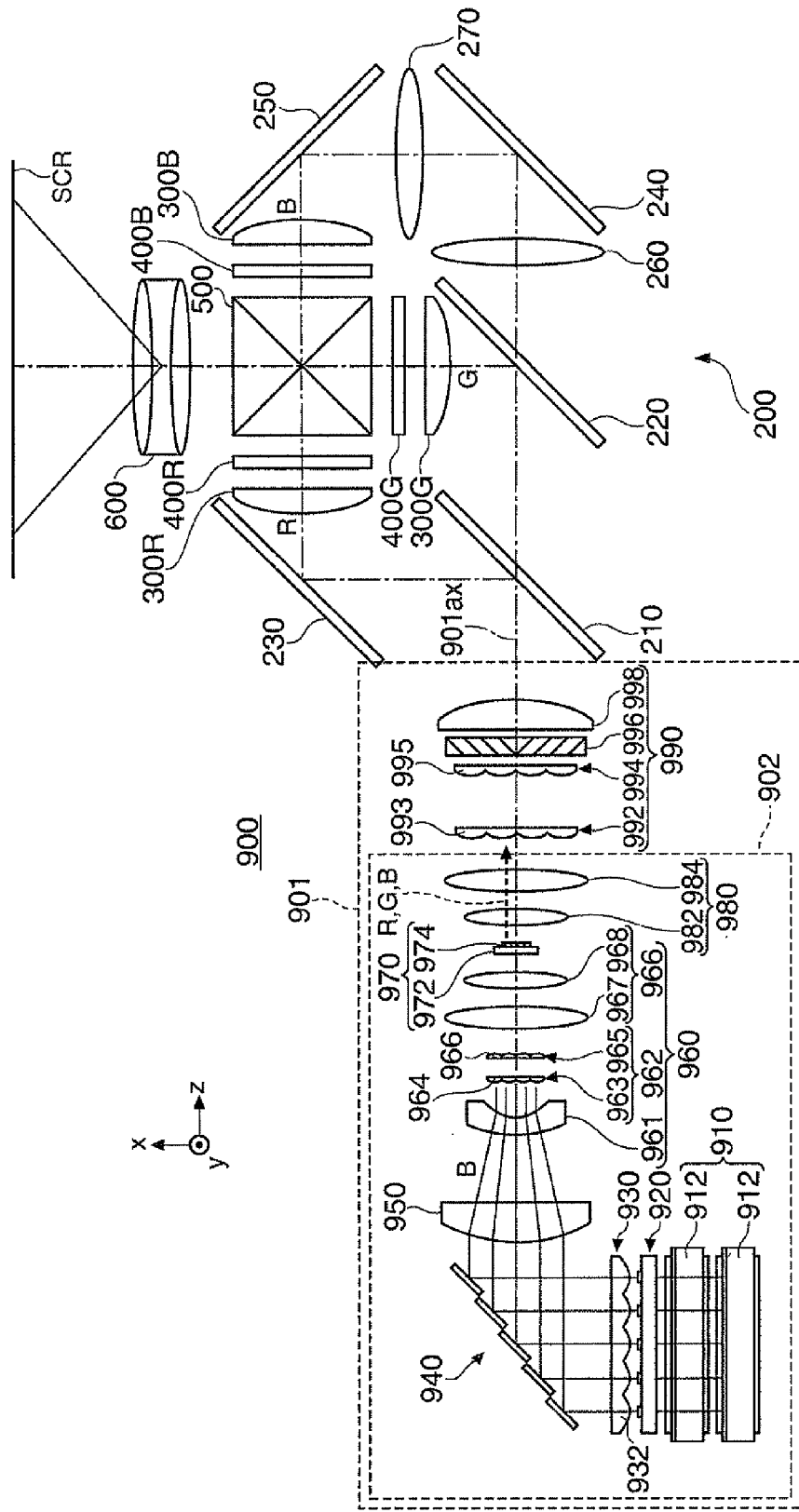
FIG. 9 is a top view showing an optical system of a projector according to the related earlier application.

FIGS. 8A to 8D are diagrams for explanation of a light source device 14 according to embodiment 3. FIG. 8A is a top view showing the light source device 14 according to embodiment 3, FIG. 8B is a side view of the light source device 14 according to embodiment 3, FIG. 8C is a graph showing light intensity of blue light entering the fluorescent layer 64, and FIG. 8D shows an in-plane light intensity distribution of the blue light entering the fluorescent layer 64.

The light source device 14 according to embodiment 3 basically has the similar configuration to that of the light source device 10 according to embodiment 1, however, the light-exiting surface of the collection system is different from that of the light source device 10 according to embodiment 1. That is, a light-exiting surface 54a of a collection system 50a comprises a flat surface as shown in FIGS. 8A and 8B.

As described above, in the light source device 14 according to embodiment 3, the light-exiting surface 54a of the collection system 50a comprises the flat surface. However, as shown in FIGS. 8C and 8D, the light with reduced peak intensity enters the fluorescent layer 64 because of the anamorphic surface (cylindrical surface) of the reflection part 40 and the above described positional relationship between the solid-state light sources 24 and the collimator lenses 32. The peak intensity here is about 240 W/mm².

As a result, though the light source device 14 according to embodiment 3 is different from the light source device 10 according to embodiment 1 in the light-exiting surface of the collection system, the life can be extended by suppression of the deterioration of the fluorescent layer and by burnout of the fluorescent layer as is the case of the light source device 10 according to embodiment 1. Further, the reduction of the light use efficiency can be suppressed and the reduction in size and in weight of the light source device can be realized.

Note that, the light source device 14 according to embodiment 3 has the similar configuration to that of the light source device 10 according to embodiment 1 except the light-exiting surface of the collection system, and thus, has the corresponding advantages of the advantages of the light source device 10 according to embodiment 1 as they are.

So far, the invention has been explained according to the above described embodiments, however, the invention is not limited to the above described embodiments. The invention may be implemented in various forms without departing from the scope thereof and, for example, the following modifications may be made.

(1) In the respective embodiments, as the solid-state light sources and the fluorescent layer, the solid-state light sources 24 that generate blue light and the fluorescent layer 64 that generates fluorescence containing red light and green light from a part of the blue light have been used, however, the invention is not limited to those. For example, as the solid-state light sources and the fluorescent layer, solid-state light sources that generate violet light or ultraviolet light and a fluorescent layer that generates color light containing red light, green light, and blue light from the violet light or ultraviolet light may be used.

(2) In the respective embodiments, the explanation has been made using the collection system comprising one collecting lens, however, the invention is not limited to that. A collection system including two or more collecting lenses may be used. In the case where the collection system includes two collecting lenses, a collection system having one of light-exiting surfaces and light-incident surfaces of the two collecting lenses including a rotationally symmetric aspheric surface, another surface including an anamorphic surface, and the other two surfaces including spherical surfaces may be used.

(3) In the respective embodiments, the light source device 10 that outputs "light that may be used as white light" has been employed, however, the invention is not limited to that. A light source device that outputs light other than "light that may be used as white light" (for example, light containing red light and green light or light containing many specific color light components) may be employed.

(4) In the respective embodiments, the solid-state light sources 24 that generate the blue light having the peak of light emission intensity of about 460 nm have been used, however, the invention is not limited to those. For example, solid-state light sources that generate blue light having the peak of light emission intensity of about 440 nm to 450 nm may be used. According to the configuration, the fluorescence generation efficiency in the fluorescent material can be improved.

(5) In the respective embodiments, the solid-state light sources 24 including the semiconductor lasers have been used, however, the invention is not limited to those. For example, solid-state light sources including light emitting diodes may be used as the solid-state light sources.

(6) In the respective embodiments, the transmissive-type projector has been used, however, the invention is not limited to that. For example, a reflective-type projector may be used. Here, "transmissive-type" refers to a type in which a light modulation device as light modulating means transmits light like a transmissive liquid crystal display device or the like, and "reflective-type" refers to a type in which a light modulation device as light modulating means reflects light like a reflective liquid crystal light modulation device or the like. In the case where the invention is applied to the reflective-type projector, the same advantages as those of the transmissive-type projector may be obtained.

(7) In the respective embodiments, the liquid crystal light modulation device has been used as the light modulation device of the projector, however, the invention is not limited to that. As the light modulation device, generally, any one that modulates incident light in response to image information may be used, and a micromirror light modulation device or the like may be used. As the micromirror light modulation device, for example, a DMD (digital micromirror device) (trademark of TI) may be used.

(8) In the respective embodiments, the projector using three liquid crystal light modulation devices has been explained as an example, however, the invention is not limited to that. The invention may be applied to a projector using one, two, four, or more liquid crystal light modulation devices.

(9) The invention may be applied to both a front-projection projector that projects a projection image from an observation side and a rear-projection projector that projects a projection image from an opposite side to the observation side.

(10) In the respective embodiments, the example in which the light source device of the invention is applied to the projector has been explained, however, the invention is not limited to that. For example, the light source device of the invention may be applied to other optical devices (for example, an optical disc device, a headlamp of an automobile, an illumination device, etc.).

The entire disclosure of Japanese Patent Application No. 2011-056264, filed on Mar. 15, 2011 is expressly incorporated by reference herein.

What is claimed is:

1. A light source device comprising:
   plural solid-state light sources;
   plural collimator lenses that respectively nearly parallelize lights from the solid-state light sources;
   a collection system that collects the lights from the plural collimator lenses; and
   a fluorescent layer that generates fluorescence from at least a part of the lights from the collection system,
   wherein at least one anamorphic surface is provided in an optical path from the plural collimator lenses to the fluorescent layer, and
   the plural solid-state light sources are located in positions different from focal positions of the plural collimator lenses in an optical axis direction.

2. The light source device according to claim 1, wherein the collection system includes a first collecting lens, and
   at least one surface of a light-exiting surface and a light-incident surface of the first collecting lens includes an anamorphic surface.

3. The light source device according to claim 1, wherein the collection system comprises one collecting lens, and
   a light-exiting surface of the collecting lens includes an anamorphic surface, and
   a light-incident surface of the collecting lens includes a rotationally symmetric aspheric surface.

4. The light source device according to claim 1, further comprising, in an optical path from the plural collimator lenses to the collection system, a reflection part that reflects the lights from the plural collimator lenses so that distances between optical axes may be made smaller.

5. The light source device according to claim 4, wherein the anamorphic surface includes a cylindrical surface having a generating line perpendicular to a direction in which the distances between the optical axes are made smaller.

6. The light source device according to claim 4, wherein the reflection part is formed in stripes and includes plural reflection surfaces along a direction perpendicular to a direction in which the distances between the optical axes are made smaller, and
   one of the plural reflection surfaces includes an anamorphic surface.

7. The light source device according to claim 6, wherein the anamorphic surface includes a cylindrical surface having a generating line perpendicular to a direction in which the distances between the optical axes are made smaller.

8. The light source device according to claim 1, wherein the fluorescent layer is provided in a position different from a focal position of the collection system in the optical axis direction.

9. The light source device according to claim 1, wherein the solid-state light sources include semiconductor lasers.

10. A projector comprising:
    an illumination device including the light source device according to claim 1;
    a light modulation device that modulates light output from the illumination device; and
    a projection system that projects the light from the light modulation device.

11. A projector comprising:
    an illumination device including the light source device according to claim 2;
    a light modulation device that modulates light output from the illumination device; and
    a projection system that projects the light from the light modulation device.

12. A projector comprising:
    an illumination device including the light source device according to claim 3;
    a light modulation device that modulates light output from the illumination device; and
    a projection system that projects the light from the light modulation device.

13. A projector comprising:
    an illumination device including the light source device according to claim 4;
    a light modulation, device that modulates light output from the illumination device; and
    a projection system that projects the light from the light modulation device.

14. A projector comprising:
    an illumination device including the light source device according to claim 5;
    a light modulation device that modulates light output from the illumination device; and
    a projection system that projects the light from the light modulation device.

15. A projector comprising:
    an illumination device including the light source device according to claim 6;
    a light modulation device that modulates light output from the illumination device; and
    a projection system that projects the light from the light modulation device.

16. A projector comprising:
    an illumination device including the light source device according to claim 7;
    a light modulation device that modulates light output from the illumination device; and
    a projection system that projects the light from the light modulation device.

17. A projector comprising:
    an illumination device including the light source device according to claim 8;
    a light modulation device that modulates light output from the illumination device; and
    a projection system that projects the light from the light modulation device.

18. A projector comprising:
    an illumination device including the light source device according to claim 9;
    a light modulation device that modulates light output from the illumination device; and
    a projection system that projects the light from the light modulation device.

* * * * *